United States Patent [19]
Arnold

[11] 3,877,972
[45] Apr. 15, 1975

[54] METHOD FOR COATING INTERIOR OVEN SURFACES TO PROVIDE EASY SOIL REMOVAL

[75] Inventor: Sharon L. Arnold, Bay City, Mich.

[73] Assignee: The Dow Chemical Company, Midland, Mich.

[22] Filed: Nov. 15, 1972

[21] Appl. No.: 306,795

Related U.S. Application Data

[62] Division of Ser. No. 170,976, Aug. 11, 1971, abandoned.

[52] U.S. Cl............ 427/384; 260/2 P; 260/33.6 R; 260/33.8 R
[51] Int. Cl.............................................. B05b 13/06
[58] Field of Search.................... 117/6, 135, 97; 260/33.6 R, 2 P, 33.8 R

[56] References Cited
UNITED STATES PATENTS

| | | | |
|---|---|---|---|
| 3,196,027 | 7/1965 | White et al. | 117/135.1 X |
| 3,303,052 | 2/1967 | Hatch et al. | 117/6 X |
| 3,494,949 | 2/1970 | Monroe et al. | 44/68 X |
| 3,497,464 | 2/1970 | Monroe et al. | 260/448 X |

Primary Examiner—William D. Martin
Assistant Examiner—Bernard D. Pianalto
Attorney, Agent, or Firm—Albin R. Lindstrom

[57] ABSTRACT
A method for providing an interior oven surface from which soil is easily removed involves coating the interior of the oven with a solution in a volatile organic solvent of a metal-oxygen-phosphorous inorganic polymer having the formula:

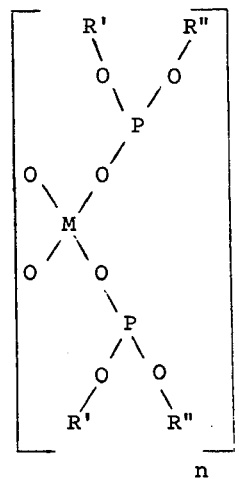

wherein M is a metal of tetrahedral configuration having two primary valence bonds and two coordination bonds, R' and R'' independently are selected from alkyl groups containing from 1 to about 25 carbon atoms and $n$ is an integer greater than 1 and evaporating the solvent.

1 Claim, No Drawings

METHOD FOR COATING INTERIOR OVEN SURFACES TO PROVIDE EASY SOIL REMOVAL

CROSS-REFERENCE TO COPENDING APPLICATION

This application is a division of copending application U.S. Ser. No. 170,976 filed Aug. 11, 1971 and now abandoned.

BACKGROUND OF THE INVENTION

1. Field of the Invention

One of the more distasteful tasks of the housewife is the periodic cleaning of the interior surfaces of an oven. Heat degraded food residues from spillage during food preparation will adhere most tenaciously to metal and procelain oven surfaces. Commonly such residues are removed with scraping and scouring using commercial oven cleaning preparations usually containing caustic as a basic ingredient.

2. Description of the Prior Art

The use of release agents generally is notorious. For surfaces subjected to heat, many well-known release agents fail, such as paraffin waxes, petroleum oils and the like; lecithin, and fats of animal or vegetable origin. These substances are either volatile with loss of agent and perhaps the evolution of odorous and undesired degradation products or, upon heating, themselves degrade to yield surface deposits which become part of the "soil;" or under prolonged heating they fail as release agents.

The use of silicone oils, notably polydimethyl siloxane, is notorious. Such coatings have suffered the disadvantage that, while relatively effective in the release of hydrophilic materials since they are themselves strongly hydrophobic, they tend to blend and mix with animal fats and vegetable oils and substances containing these materials, with the result that release of fats and oils is effectuated only when cleaning promptly follows soiling. As a result, persons relying upon polydimethylsiloxane oils alone may have often been disappointed in the release of thermally degraded fat substances.

In U.S. Pat. No. 3,196,027 there is described a coating composition of a film forming dimethylpolysiloxane in a suitable volatile vehicle. It is said that when that composition is applied to the interior surface of an oven, newly accumulated deposits of heat degraded food is easily removed.

U.S. Pat. No. 3,497,464 relates to inorganic metal-oxygen-phosphorous polymers stated to be useful in flame retardant applications, as viscosity improvers for hydrocarbon oils and for forming shaped articles such as gaskets.

SUMMARY OF THE INVENTION

According to the present invention a solution is provided by dissolving a metal-oxygen-phosphorous polymer in a volatile solvent. The useful polymers have the formula:

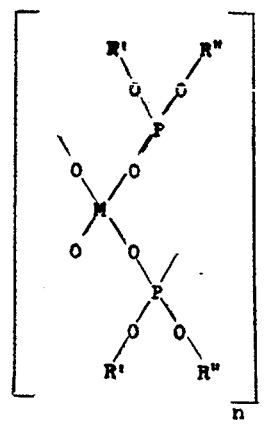

wherein M is a metal, such as aluminum, zinc, cobalt or boron, having a tetrahedral configuration having two primary valence bonds and two coordination bonds, R' and R" independently are alkyl groups of from 1 to about 25 carbon atoms and $n$ is an integer greater than 1. The useful polymers may be prepared by methods shown in U.S. Pat. No. 3,494,949, Examples I and II whereby for example, a diester of orthophosphoric acid is reacted with the metal hydroxide in a solvent such as kerosene.

The R groups in the above structure influence the solubility characteristics of the polymer. As will be pointed out the benefits of the invention are achieved by depositing a continuous film on an oven surface. By varying the organic groups the solubility of polymer in a wide variety of solvents can be achieved. Typical of these groups may be mentioned bishexadecyl, ethyl dodecyl, n-butyl dodecyl, n-butyl hexadecyl, isobutyl dodecyl, octyl oleyl, hexyl oleyl, methyl oleyl, and ethyl oleyl. Once applied to the oven surface the functionality of the R groups is minimal and even is removed from the polymer by some chemical reaction, the film will still provide interference with the bonding of the soil to the oven surface.

The polymers will dissolve in certain solvents and yet when desolvated appear to form some kind of lattice structure which is an effective barrier to penetration of soils as are encountered in an oven. The lattice structure, and thus the integrity of the film, can be destroyed with amines, ammonia, glycols and the like.

The useful solvents for the compositions of this invention are those that will dissolve the polymer at ambient temperature in a concentration to provide a film forming composition and are volatile and chemically stable at room temperature and at the temperature of an oven heated to 500° to 600°F. Typical solvents are the lower hydrocarbons such as hexane, the chlorinated hydrocarbons such as methyl chloroform or the chlorofluorocarbons such as the Freon halogenated materials. Hexane and methyl chloroform are preferred.

The solution should contain sufficient amounts of the polymer to form a continuous film when coated onto a substrate and the solvent permitted to volatilize. The concentration may be varied within wide limits depending upon the polymer used and its degree of polymerization, the thickness of the coating desired, the efficiency of the solvent and other known factors. Generally an amount of from about 0.1 to about 1.0 weight percent will be preferred. Below about 0.1 weight percent there are usually insufficient solids to provide a film with the continuity and body to effectively interfere with the adherence of the soil to the oven surface to provide easy removal thereof. Above about 1.0 weight percent the solution is generally so viscous as to be difficult to apply a uniform coating and particularly a thin coating by conventional coating methods. Also with such viscous compositions the solvent is difficultly volatilized. These compositions are thixotropic so that a viscosity can be used that will provide easy application to the surface and yet will adhere to vertical surfaces.

The thickness of the coating that will accomplish the benefits and objectives of the invention may be varied. The minimum required to provide ready removal of the accumulated soil is preferred. This minimum is achieved when sufficient polymer is deposited on the surface to provide a continuous film. As is generally true in the coatings art, the thickness of the coating depends primarily on the solids content of the composition deposited on the substrate. It is one of the important advantages of this invention that a composition containing as little as 0.1 to 0.5 weight percent of the film forming polymer will form a film capable of interfering with the bonding of soil to the substratum.

The solution may also contain odorant agents although such use is peripheral to the invention. They should in general be volatile without such side reactions as form unpleasant by-products.

Coloring substances are also peripheral to the invention and a matter of esthetic choice. Illustrative of some that are available are an iron oxide-hydroxide mixture with which shades from off-white to tan are readily prepared; the various aluminates of cobalt wherewith blue tints are achieved; and the oxides of chromium giving green coloration.

The solution may be applied by conventional coating methods such as brush, roller, dip or doctor blade coating techniques. Alternatively the preparation may be applied by air spray or liquid pressure spray. Yet another method is to charge the solution into an aerosol can with propellant pressure from the solvent or added propellant.

If the objectives of the invention are to be completely realized the surface to which the composition is to be applied must be clean. If soil is already bonded to the surface before the composition is applied, the film will coat over that soil and generally prevent bonding of newly accumulated soil to the oven surface, but when the oven is cleaned the film will only provide easy cleaning for that deposited after treatment. That soil that was bonded to the oven surface will have to be removed by the tedious prior methods of saponification, scouring and scraping.

In use the solution is applied directly to the clean interior surfaces of the oven from which easy removal of a heat degraded food residue is desired. The coating should be substantially continuous over the surface to attain these benefits. As soon as the coating is applied it protects. However, it is desirable to permit the volatile solvent and odorant, if used, to be driven off by heating for a period, such as fifteen minutes.

The concept of this invention utilized a polymer film to which soil will adhere but not permeate to bond to the oven surface. The film is sacrificed in cleaning and in removing the film the soil is also removed. Thus after soil has been intercepted on the coated surface, cleaning is easily achieved by destroying the polymeric film with ammonia, amines, glycols, commercial oven cleaning agents and the like followed by removal of residue of the polymeric film and the soil together by wiping. It should be apparent that the lattice breaking material must penetrate the soil to contact the underlying film. For that reason the ammonia or other substance should be permitted to contact the film for some short time of for example 15 minutes or so before removal begins. The lattice breaking material may be conveyed to the coated surface in any convenient manner. For example a pan of ammonia water may be left in the oven. The material may be swabbed, brushed, pressure sprayed as by an aerosol or otherwise brought into contact with the film. After the period of time a light rubbing action with a damp sponge, cloth or other means will remove the film and soil.

After cleaning it is desirable to recoat the interior surfaces with new protective coating composition.

The invention is illustrated by the following examples wherein all parts and percentages are by weight.

EXAMPLE 1

Aluminum ethyl oleyl orthophosphate was dissolved at a concentration of 0.2 percent in n-hexane. The solution was painted on porcelain panels at room temperature with half the panel covered so that each panel provided its own control surface. The panels were soiled with polymerized lard and cherry pie filling and baked in an oven from 1 to 122 hours. A commercial oven cleaning solution was sprayed on the panels and after a short period the panels were inserted in a Gardner Shaight Line Scrub Tester using a sponge. In all cases the soil and film were removed from the treated surface with few strokes whereas the soil on the control surfaces continued to adhere tenaciously. In like manner the n-hexane was replaced by 1,1,1-trichloroethane with similar results. Also aluminum ethyl dodecyl orthophosphate was used with like benefits.

Although the invention has been exemplified by painting a solution of polymer in an organic solvent on an oven surface with a brush, it should be understood that the composition can be applied equally well with any conventional coating technique. Also the solution can be emulsified or dispersed in a continuous phase and applied to the oven surface. The techniques known to the coating art are well known and are applicable hereto.

What is claimed is:

1. The method of providing an oven with an interior surface from which heat degraded food residues are easily removed comprising the steps of (1) applying a continuous coating to the surface to be protected of a solution of (a) from 0.1 to 0.5 weight percent of a metal-oxygen-phosphorous polymer of the formula:

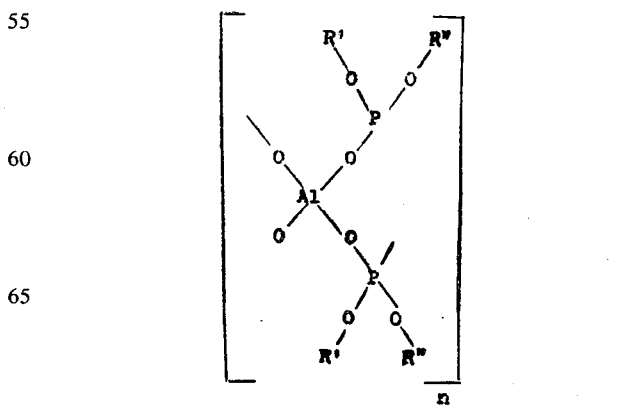

wherein R' and R" are independently selected from alkyl groups containing from 1 to 25 carbon atoms and $n$ is an integer greater than 1 and (b) a volatile organic solvent and (2) evaporating the solvent from the coating.

* * * * *